Sept. 29, 1942.     W. McKINLEY     2,297,064
FLOATING TOOL HOLDER
Filed Sept. 29, 1941
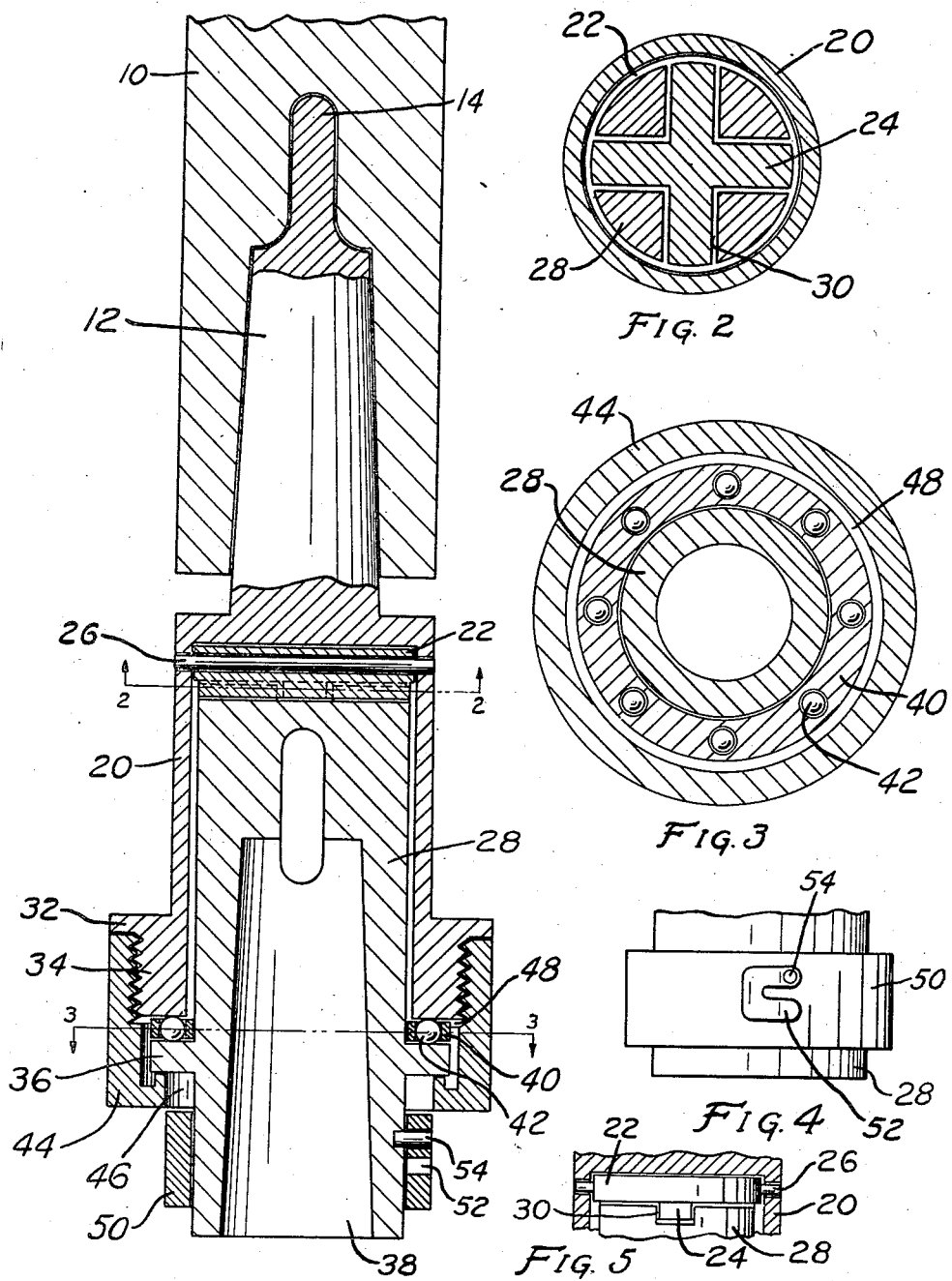
William McKinley
Inventor Patented Sept. 29, 1942

2,297,064

UNITED STATES PATENT OFFICE 2,297,064

FLOATING TOOLHOLDER

William McKinley, Moline, Ill.

Application September 29, 1941, Serial No. 412,809

6 Claims. (Cl. 279—16)

This invention relates to a new and improved floating tool holder and has for one of its principal objects the provision of a device which permits of true holes regardless of the condition of the machine used whether it be a drill press, a boring machine or any other similar type machine.

An important object of this tool holder is to allow a lateral floating of the tool to compensate for any misalignment which may be inherent with the machine employed.

Another important object of this apparatus is its provision of guaranteeing that the tool, although permitted to float laterally, will always be in parallel alignment with the head of the machine employing the tool and thereby insure a hole at right angles to the material being cut.

A further important object of this invention is to provide a tool holder capable of rigidly supporting a tool or capable of supporting a tool having free lateral motion.

Other and further important objects of this invention will become apparent from the disclosures in the following specification and accompanying drawing, in which:

Fig. 1 is a vertical sectional view of the floating tool holder of this invention.

Fig. 2 is a transverse sectional view taken on the line 2—2 of Fig. 1.

Fig. 3 is a transverse sectional view taken on the line 3—3 of Fig. 1.

Fig. 4 is a partial front view of the lower end of the floating tool holder.

Fig. 5 is a partial side elevation of the floating tool driving means shown in cross section in Fig. 2.

As shown in the drawing:

The reference numeral 10 indicates generally a spindle of a drill press, a boring machine, or some other similar type machine. This spindle 10 is equipped with a tapered socket into which a tool holder shank 12 having a corresponding taper is inserted and held secure by frictional engagement. The shank has a tongue 14 fitted into a similarly shaped portion of the socket.

The shank 12 has a cylindrical housing 20 depending rigidly therefrom which holds the circular washer 22 having a cross shaped male projection 24. The washer is held non-rotatable in the hollow cylindrical housing 20 by the pin 26. The tool receiving member 28 likewise fits loosely within this housing 20 and in turn non-rotatably engages the washer 22 by the cross shaped female socket 30. The nesting of the projection 24 on the washer member 22 in the socket 30 in the member 28 is comparatively loose and allows some lateral movement of the two members 22 and 28 relative to each other.

The lower end of the cylindrical housing 20 has an enlarged annular flange 32 and a threaded extension 34 of smaller diameter than that of the flange 32.

The tool holding member 28 similarly has an outwardly extending annular flange 36 and a tapered socket 38 corresponding to the tapered socket in the machine spindle 10. A ball bearing retainer 40 best shown in Fig. 3 has ball bearings 42. The retainer 40 surrounds the member 28 and rests on the annular flange 36. The ball bearings engage the surface of the flange 36 and the bottom of the member 28 immediately beneath the threaded extension 34.

A cap nut 44 threadedly engages the extension 34 on the member 20 and maintains the tool holding member 28 within the housing 20 by engaging the lower side of the annular flange 36. The cap nut 44 has an aperture 46 therethrough which permits the lower end of the tool holding member 28 to extend therethrough. Surrounding the ball bearing retainer 40 is a space 48 which allows lateral movement of the member 28.

Around the lower end of the member 28 fits the cylindrical element 50 whose outside diameter is just slightly less than the diameter of the bore 46 through the cap nut 44. As best shown in Fig. 4 the sleeve 50 is equipped with a C shaped aperture 52 which holds the pin 54 that is press fitted into the member 28.

In operation, the tool holding member 28 is allowed to move or float laterally on the ball bearings 42 making it possible to drill or ream perfectly a hole whether the machine spindle is in proper alignment or not. When it is desired to eliminate the floating action the sleeve 50 normally locked against vertical movement because of the pin 54 in the upper right hand corner of the C shaped slot 52 is twisted and moved upwardly into the bore 46 of the cap nut 44 whereupon the pin 54 moves to the bottom of the C shaped aperture 52. A twisting action on the sleeve 50 then causes the pin 54 to be positioned in the lower right hand corner of the C shaped slot and thereby locks the sleeve 50 in its upward position. No lateral motion is then allowed as any space for the member 28 to float in is filled by the sleeve 50.

The advantages of this floating tool holder are numerous in that the self alignment of cutting tools, such as reamers, taps and drills prevent holes with very close tolerances from being machined oversize, and in addition minimizes breakage of tools and materials being cut. The cross shaped driving action of the cross projection 24 loosely nesting in the cross shaped slot 30 gives equal driving pressure at any or all angles, and permits ready floating of the tool used.

I am cognizant of the fact that numerous details of construction may be varied throughout a wide range without departing from the principles described, and I therefore desire only to be limited by the scope of the prior art.

I claim as my invention:

1. A tool holder adapted to engage the usual machine spindle, comprising: a hollow cylindrical housing; a member having a cross shaped projection non-rotatably engaged to and positioned within the said hollow cylindrical housing; a tool holding member having a cross shaped slot adapted to fit loosely within the said cylindrical housing and loosely engage the said member having a cross shaped projection; an outwardly extending annular flange on the said tool holding member; a ball bearing unit annularly positioned around the said tool holding member and resting on the outwardly extending annular flange; a cap nut threadedly engaging the cylindrical housing and engaging the underside of said outwardly extending annular flange; the said cap nut having a bore through which the lower end of the tool holding member extends; a sleeve telescoping the lower end of said tool holding member; the said sleeve having a slot therein; a pin fixedly attached to the said tool holding member, and loosely positioned through the slot in the said sleeve, whereby the said sleeve is permitted vertical upward movement into the bore of the said cap nut; means for holding the said sleeve in an upward position, whereupon lateral movement of the tool holding member is prevented.

2. A floating tool holder comprising a shank for engagement with a machine spindle, a cylindrical casing extending downwardly from said shank, a washer member positioned in and fastened by a transverse pin to the said casing and having a cross shaped projection on its under face, a cylindrical tool holding member positioned in the said casing and having a cross shaped indentation for the loose reception of the said cross shaped projection on the said washer to effect rotation of one member by the other, an outwardly extending annular flange near the lower end of said tool holding member, a ball bearing positioned between the said flange and the bottom of the said cylindrical casing, means for holding the tool holding member in the said casing.

3. A floating tool holder comprising a shank for engagement with a machine spindle, a cylindrical housing extending downwardly from said shank, a washer member positioned in and fastened to the said housing having a cross shaped projection on its under face, a cylindrical tool holding member positioned in the said housing and having a cross shaped indentation for the loose reception of the said cross shaped projection on the said washer to effect rotation of one member by the other, an outwardly extending annular flange near the lower end of said tool holding member, a ball bearing positioned between the said flange and the bottom of the said cylindrical housing, the said cylindrical housing having a portion of its lower end externally threaded, a cap nut having a bore the diameter of which is larger than the diameter of the said tool holding member, whereby the cap nut threadedly engages the cylindrical housing drawing up the tool holding member in the housing by acting against the flange of the said tool holding member.

4. A floating tool holder comprising a shank for engagement with a machine spindle, a cylindrical housing extending downwardly from said shank, a driving member positioned in and fastened to the said housing having a cross shaped projection on its under face, a cylindrical tool holding member positioned in the said housing and having a cross shaped indentation for the loose reception of the said cross shaped projection on the said driving member to effect rotation of one member by the other, an outwardly extending annular flange near the lower end of said tool holding member, a ball bearing positioned between the said flange and the bottom of the said cylindrical housing, the said cylindrical housing having a portion of its lower end externally threaded, a cap nut having a bore the diameter of which is larger than the diameter of the said tool holding member, whereby the cap nut threadedly engages the cylindrical housing drawing up the tool holding member in the housing by acting against the flange of the said tool holding member, a sleeve below the said cap nut slidably telescoping the said cylindrical tool holding member, means for permitting the said sleeve to be raised upwardly into the bore of the cap nut, whereby lateral movement of the said tool holding member in the said casing is prevented.

5. A floating tool holder comprising a shank for engagement with a machine spindle, a cylindrical housing extending downwardly from said shank, a driving member positioned in and fastened to the said housing having a cross shaped projection on its under face, a cylindrical tool holding member positioned in the said housing and having a cross shaped indentation for the loose reception of the said cross shaped projection on the said driving member to effect rotation of one member by the other, an outwardly extending annular flange near the lower end of said tool holding member, a ball bearing positioned between the said flange and the bottom of the said cylindrical housing, the said cylindrical housing having a portion of its lower end externally threaded, a cap nut having a bore therethrough, whereby the cap nut threadedly engages the cylindrical housing drawing up the tool holding member in the housing by acting against the flange of the said tool holding member, a sleeve below the said cap nut and telescoping the said cylindrical tool holding member, means for permitting the said sleeve to be raised upwardly into the bore of the cap nut, whereby lateral movement of the said tool holding member in the said casing is prevented, said last named means comprising a C shaped aperture in said sleeve and a fixed pin in said tool holding member adapted to slide in the C shaped aperture of the said sleeve.

6. A tool holder capable of floating and non-floating action, comprising: a housing; a tool holder adapted to loosely engage said housing; means for permitting lateral motion of the tool holder within the said housing; a sleeve adapted to slide on the said tool holder, said sleeve having a material thickness equal to the space between the loose fitting tool holder and housing; means for sliding said sleeve between the tool holder and housing; further means for locking said sleeve in its interposed position; said further means comprising at least a two directional aperture in said sleeve and a fixed pin in said tool holder adapted to slide in said sleeve aperture; whereby no lateral motion of tool holder with respect to the housing is permitted.

WILLIAM McKINLEY.